(12) United States Patent
Anderson

(10) Patent No.: US 10,059,271 B2
(45) Date of Patent: Aug. 28, 2018

(54) COMPONENT FOR A VEHICLE

(71) Applicant: Shanghai Yanfeng Jinqiao Automotive Trim Systems Co., Ltd., Plymouth, MI (US)

(72) Inventor: Rick Alan Anderson, Grand Haven, MI (US)

(73) Assignee: Shanghai Yanfeng Jinqiao Automotive Trim Systems Co. Ltd., Novi, MI (US)

( * ) Notice: Subject to any disclaimer, the term of this patent is extended or adjusted under 35 U.S.C. 154(b) by 0 days.

(21) Appl. No.: 15/342,323

(22) Filed: Nov. 3, 2016

(65) Prior Publication Data

US 2017/0050572 A1 Feb. 23, 2017

Related U.S. Application Data

(63) Continuation of application No. PCT/US2015/031822, filed on May 20, 2015.

(60) Provisional application No. 62/001,584, filed on May 21, 2014.

(51) Int. Cl.
*B60R 7/06* (2006.01)
*B60R 7/04* (2006.01)
*B60N 2/75* (2018.01)

(52) U.S. Cl.
CPC .............. *B60R 7/06* (2013.01); *B60N 2/793* (2018.02); *B60R 7/046* (2013.01)

(58) Field of Classification Search
CPC ......... B60R 7/06; B60R 7/046; B60N 2/4686; B60N 2/793
USPC ....................................................... 296/37.8
See application file for complete search history.

(56) References Cited

U.S. PATENT DOCUMENTS 5,265,450 A 11/1993 Doyle
6,120,069 A 9/2000 Taranto
7,048,311 B2 * 5/2006 Sawatani .................. B60R 7/06
292/32

(Continued)

FOREIGN PATENT DOCUMENTS

DE 10036945 2/2002
EP 1916132 A1 4/2008

(Continued)

OTHER PUBLICATIONS

International Search Report dated Sep. 7, 2015 for International Application No. PCT/US2015/031822.

(Continued)

*Primary Examiner* — Joseph D. Pape
*Assistant Examiner* — Dana D Ivey
(74) *Attorney, Agent, or Firm* — Christopher G. Darrow; Darrow Mustafa PC

(57) ABSTRACT

A component for a vehicle is disclosed. A component for a vehicle interior may comprise a base, a bin, a cover configured to move relative to the bin from (1) a closed position to cover the bin to (2) an intermediate position to at least partially uncover the bin to (3) an open position to uncover the bin, a latch assembly coupled to the cover configured to release the cover from the base, a latch actuated by the latch assembly and configured to secure the cover to the base and a cable extending between the latch assembly and the latch. The latch may be configured to secure the cover to the base in the closed position, the intermediate position and the open position.

20 Claims, 4 Drawing Sheets

(56) References Cited

U.S. PATENT DOCUMENTS

| | | |
|---|---|---|
| 8,033,582 B2 | 10/2011 | Sawatani et al. |
| 2003/0209956 A1 | 11/2003 | Bae |
| 2004/0017088 A1 | 1/2004 | Sawatani et al. |
| 2006/0055196 A1 | 3/2006 | Yamada |
| 2011/0115246 A1 | 5/2011 | Beyer |
| 2011/0309640 A1 | 12/2011 | Matsubara |
| 2015/0152671 A1 | 6/2015 | Nakasone |
| 2015/0240539 A1 | 8/2015 | Abe |
| 2016/0339848 A1 | 11/2016 | Hodgson |
| 2016/0340942 A1 | 11/2016 | Anderson et al. |

FOREIGN PATENT DOCUMENTS

| | | |
|---|---|---|
| FR | 394843 | 10/1908 |
| FR | 2817897 A1 | 8/2015 |
| GB | 2130291 A | 5/1984 |
| JP | 2006076344 A | 3/2006 |
| JP | 2007056613 A | 3/2007 |
| JP | 2012225075 A | 11/2012 |
| WO | 2015120034 A1 | 8/2015 |
| WO | 2015123442 A1 | 8/2015 |

OTHER PUBLICATIONS

Written Opinion of the International Searching Authority dated Sep. 17, 2015 for International Application No. PCT/US2015/031822.
Written Opinion of the International Search Authority dated May 26, 2015 for International Application No. PCT/US2015/015672.
International Search Report dated May 13, 2015 for International Application No. PCT/US2015/015672.
Written Opinion of the International Search Authority dated Apr. 15, 2015 for International Application No. PCT/US2015/014437.
International Search Report dated Apr. 8, 2015 for International Application No. PCT/US2015/014437.
Non-Final Office Action from the United States Patent and Trademark Office for U.S. Appl. No. 15/227,920 dated Jan. 16, 2018 (23 pages).
Non-Final Office Action from the United States Patent and Trademark Office for U.S. Appl. No. 15/229,402 dated Jan. 26, 2018 (5 pages).
Communication pursuant to Article 94(3) EPC from the European Patent Office for EP Patent Application No. 15 729 976.9 dated May 9, 2017 (in English) (4 pages).
Response to Communication pursuant to Article 94(3) EPC from the European Patent Office for EP Patent Application No. 15 729 976.9 filed Sep. 18, 2017 (in English) (8 pages).
Communication pursuant to Article 94(3) EPC from the European Patent Office for EP Patent Application No. 15 729 976.9 dated Nov. 6, 2017 (in English) (5 pages).
Response to Communication pursuant to Article 94(3) EPC from the European Patent Office for EP Patent Application No. 15 729 976.9 filed Feb. 14, 2018 (in English) (12 pages).

\* cited by examiner

COMPONENT FOR A VEHICLE

CROSS REFERENCE TO RELATED APPLICATIONS

The present application is a continuation of International Application No. PCT/US15/031822 titled "LATCH ASSEMBLY FOR A VEHICLE" filed May 20, 2015.

The present application claims priority from and the benefit of and incorporates by reference in entirety of the following applications: (a) International Application No. PCT/US15/031822 titled "LATCH ASSEMBLY FOR A VEHICLE" filed May 20, 2015; (b) U.S. Provisional Patent Application No. 62/001,584 titled "LATCH ASSEMBLY FOR A VEHICLE" filed May 21, 2014.

FIELD

The present invention relates to a component for a vehicle. The present invention also relates to a component providing a latch assembly for a vehicle interior component.

BACKGROUND

It is known to provide a latching mechanism for a vehicle interior. It is also known to provide one or more storage compartments within the vehicle interior to store cargo and/or various items. It is known to provide a storage compartment within a center console intended to store various items such as sunglasses, driving glasses, wallet, etc. It is also known to provide a storage compartment within an overhead console, an armrest, seats, door panels, and/or an instrument panel, etc. It is known to provide a door configured to facilitate access of the storage compartment. It is known to provide a latching mechanism (e.g. a latch assembly) to secure the door in an open position and/or a closed position and/or any position between the open position and the closed position.

It would be advantageous to provide an improved latching mechanism (e.g. a latch assembly) that is easy to operate and/or inexpensive to manufacture.

SUMMARY

The present invention relates to a component for a vehicle interior. The component comprises a base; a bin; a cover configured to move relative to the bin from (1) a closed position to cover the bin to (2) an intermediate position to at least partially uncover the bin to (3) an open position to uncover the bin; a latch assembly coupled to the cover configured to release the cover from the base; a latch actuated by the latch assembly and configured to secure the cover to the base; and a cable extending between the latch assembly and the latch. The latch may be configured to secure the cover to the base in the closed position, the intermediate position and the open position. The latch assembly may comprise a button configured to release the cover from the base. The latch may comprise a pin coupled to the cable configured to engage a recess of the base to secure the cover to the base. The latch assembly may comprise a first arm configured to release the cover from the base in response to a force at the button; the first arm may be configured to move the cable from an extended position to a retracted position to actuate the latch to release the cover from the base. The latch assembly may comprise a second arm and a linkage configured to substantially link translation of the second arm and the first arm. The latch assembly may comprise a spring configured to move the cable from the retracted position to the extended position to secure the cover to the base. The base may comprise a support structure. The cover may comprise at least one of (a) an armrest, (b) an access door, (c) a door, (d) a tambour door; the bin may comprise a storage area; the component may comprise at least one of (a) a center console, (b) a dash, (c) a door panel, (d) an instrument panel, (e) a trunk storage system, (f) an armrest. The latch may comprise at least one of (a) a latch device and (b) a remote latch device.

The present invention also relates to a component for a vehicle interior. The component comprises a base; a bin; a cover configured to move relative to the bin from (1) a closed position to cover the bin to (2) an open position to uncover the bin; a latch assembly coupled to the cover comprising a button; a latch actuated by the latch assembly and configured to secure the cover to the base; and a cable extending between the latch assembly and the latch. The cover may be released from the base in response to actuation of the button. The latch may be configured to secure the cover to the base in the closed position and the open position. The latch assembly may comprise a first side arm configured to translate in response to actuation of the button; a second side arm configured to translate in response to actuation of the button; and a cable extending between the first side arm and the latch; translation of the first side arm actuates the cable to a remote actuating device and release the cover from the base. The latch assembly may comprise a first wedge coupled to the first side arm and configured to translate the first side arm in response to actuation of the button; the latch assembly may comprise a second wedge coupled to the second side arm configured to translate the first side arm in response to actuation of the button; the latch assembly may comprise a linkage configured to substantially link translation of the second side arm to translation of the first side arm. The latch may comprise at least one of (a) a latch device and (b) a remote latch device.

The present invention further relates to a component for a vehicle interior. The component comprises a base; a bin; a cover configured to move relative to the bin from (1) a closed position to cover the bin to (2) an open position to uncover the bin; a latch assembly coupled to the cover comprising a button configured to release the cover from the base; a latch actuated by the latch assembly and configured to secure the cover to the base; a cable extending between the latch assembly and the latch; and a spring coupled to the cover. The spring may be configured to provide a force to the latch to secure the cover to the base and a force to the button to prevent movement of the button. The latch assembly may comprise a rack and pinion mechanism and the spring; the rack and pinion mechanism may comprise a gear and two racks; each rack may comprise an arm.

FIGURES

DESCRIPTION

Figure 1:
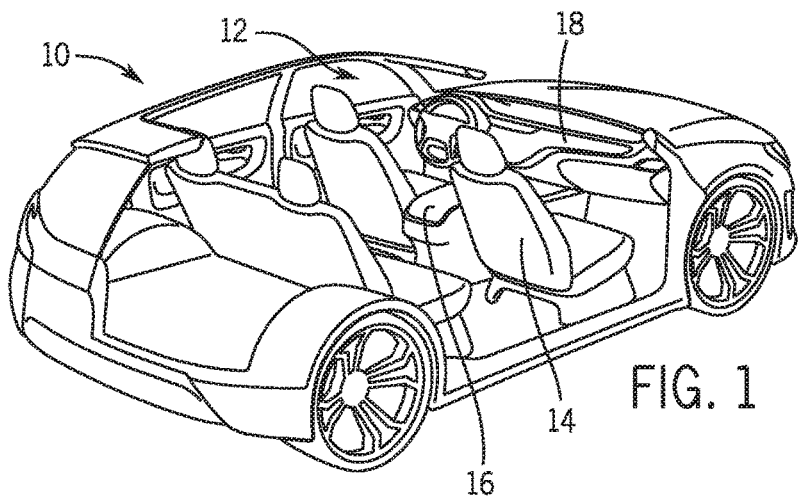
FIG. 1 is a schematic perspective view of a vehicle showing a vehicle interior according to an exemplary embodiment.

Referring to FIG. 1, a vehicle 10 is shown including an interior 12 with seats 14 and a console shown as a center console 16 and a dashboard or instrument panel 18 according to an exemplary embodiment.

Figures 2, 3:
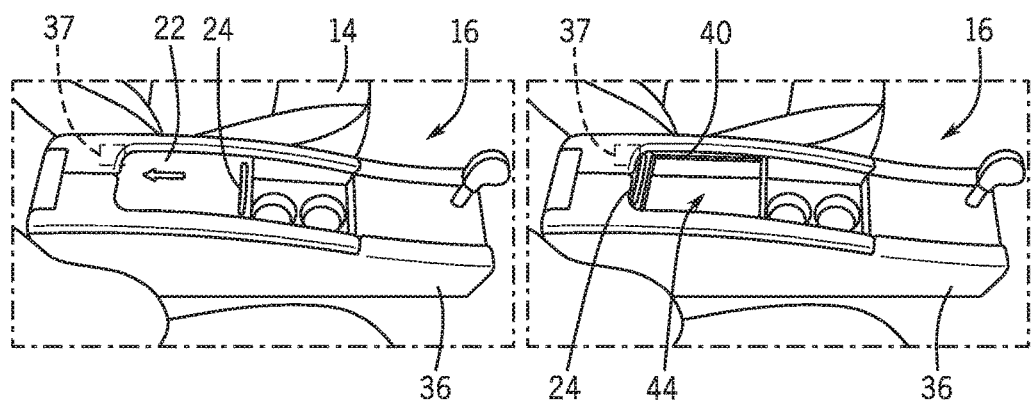
FIG. 2 is a schematic perspective view of a center console for the vehicle interior according to an exemplary embodiment.
FIG. 3 is a schematic perspective view of the center console showing a storage compartment according to an exemplary embodiment.

As shown schematically in FIGS. 2 and 3 according to an exemplary embodiment, vehicle interior 12 comprises a console shown as center console 16. Center console 16 comprises a storage compartment 44. Center console 16 comprises a cover or a door shown as a tambour door 22; tambour door 22 facilitates access to storage compartment 44 according to an exemplary embodiment. As shown schematically in FIG. 2, tambour door 22 is at a closed position; tambour door 22 covers storage compartment 44. As shown schematically in FIG. 3, tambour door 22 is at an open position; storage compartment 44 is exposed. As shown schematically in FIG. 3, center console 16 provides a track 40; track 40 is configured to facilitate movement of tambour door 22 between the closed position and the open position. As shown schematically in FIGS. 2 and 3, tambour door 22 provides a latch assembly 24. According to an exemplary embodiment, latch assembly 24 is configured to secure tambour door 22 at various locations between the closed position and the open position. According to an exemplary embodiment, latch assembly 24 may include a cable that extends to a remote latching mechanism/device; the remote latching mechanism/device is configured to engage at least one remote corresponding recess 37. See FIGS. 2 and 3.

Figure 4:
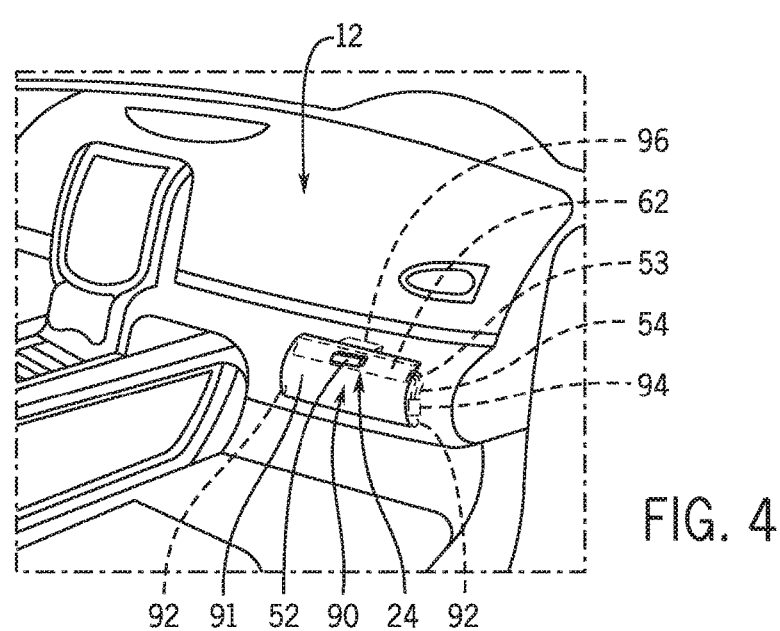
FIG. 4 is a schematic perspective view of the vehicle interior showing a glove compartment according to an exemplary embodiment.

As shown schematically in FIG. 4 according to an exemplary embodiment, a vehicle interior 12 comprises a compartment shown as a glove compartment 90. Glove compartment 90 provides a door 91 configured to facilitate access of glove compartment 90. According to an exemplary embodiment, door 91 moves between a closed position and an open position. As shown schematically in FIG. 4, door 91 comprises latch assembly 24; latch assembly 24 is configured to secure door 91 at the closed position.

Figure 5:
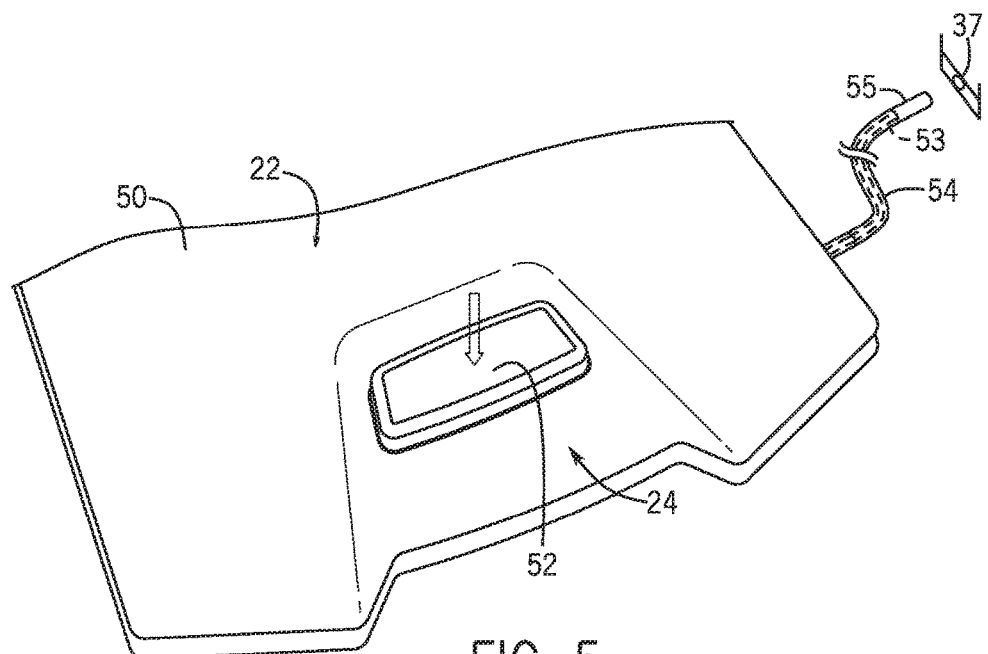
FIG. 5 is a schematic perspective partial view of a door or a cover for a storage compartment for the vehicle interior according to an exemplary embodiment.

As shown schematically in FIG. 5 according to an exemplary embodiment, tambour door 22 comprises a substrate 50; tambour door 22 may provide a series of parallel ribs coupled to cover 50; tambour door 22 provides latch assembly 24. As shown schematically in FIG. 5, latch assembly 24 provides a button 52, a cable 53, a sheath 54, and a remote latching device 55. As shown schematically in FIG. 5, cable 53 provides a length of cable external of the latch assembly 24; cable 53 is covered by sheath 54; cable 53 is connected to remote latching device 55. According to an exemplary embodiment, remote latching device 55 is configured to engage with the corresponding remote recess 37 on center console 16. See also FIGS. 2 and 3. According to an exemplary embodiment, button 52 moves between a raised/uncompressed position (see FIGS. 7 and 8) and a depressed position (see FIGS. 9 and 10); button 52 provides a user control or interface to actuate (e.g. direct operation of) the latch assembly 24 (e.g. facilitate movement of cable 53 between an extended position and a retracted position).

Figure 6:
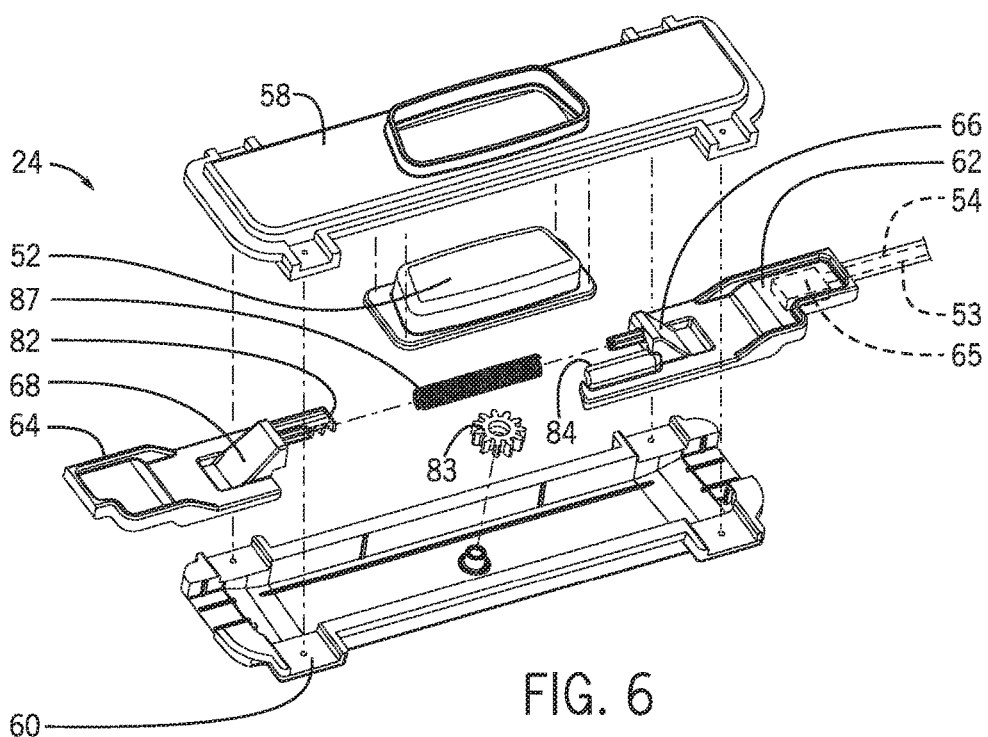
FIG. 6 is a schematic exploded view of a latch assembly for the door or cover according to an exemplary embodiment.

As shown schematically in FIG. 6 according to an exemplary embodiment, latch assembly 24 comprises an upper housing 58 and a lower housing 60. Latch assembly 24 also comprises a spring 87, a left side arm 64, a right side arm 62 and a gear shown as a pinion 83 between upper housing 58 and lower housing 60. According to an exemplary embodiment, right side arm 62 comprises an interlocking section shown as a rack 84 and right wedge 66; left side arm 64 comprises an interlocking section shown as a rack 82 and left wedge 68. According to an exemplary embodiment, right wedge 66 and left wedge 68 are configured to engage with button 52. Rack 84 and rack 82 each provide teeth 86 to engage teeth 88 on pinion 83; spring 87 is configured to couple right side arm 62 and left side arm 64; spring 87 is biased to push right side arm 62 and left side arm 64 outward to the extended position. According to an exemplary embodiment, remote latching device 55 on the end of cable 53 is intended to engage with the corresponding remote recess 37 on center console 16 to secure tambour door 22 in positions such as at the open position and the closed position and at other intermediate positions (e.g. various partly-closed and partly-opened positions).

Figure 7:
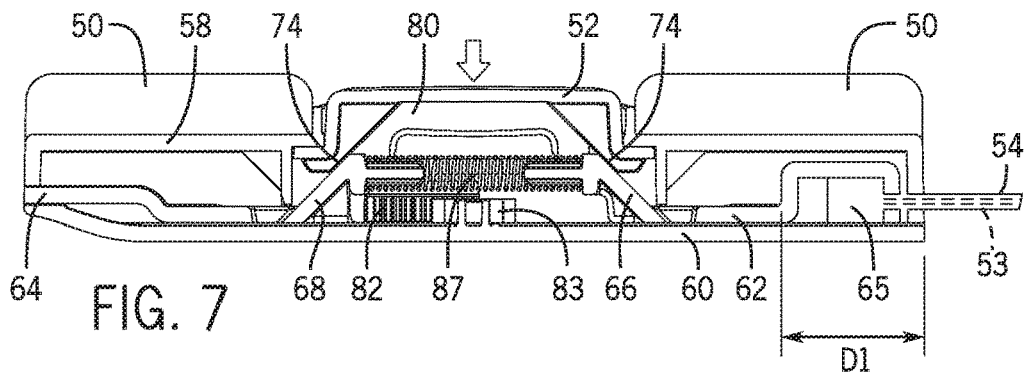
FIG. 7 is a schematic cross-section side view of the latch assembly at an extended/latched position according to an exemplary embodiment.

As shown schematically in FIG. 7 according to an exemplary embodiment, left side arm 64 and right side arm 62 are at the extended position. As shown schematically in FIGS. 6 and 7, right side arm 62 provides a right wedge 66; left side arm 64 provides a left wedge 68; button 52 provides two surfaces 74 configured to engage with right wedge 66 and left wedge 68 respectively. As shown schematically in FIG. 7, right side arm 62 provides a support structure 65; cable 53 is coupled to the support structure 65 and the right side arm 62, and the cable 53 extends laterally outward from the housing 58, 60.

Figure 8:
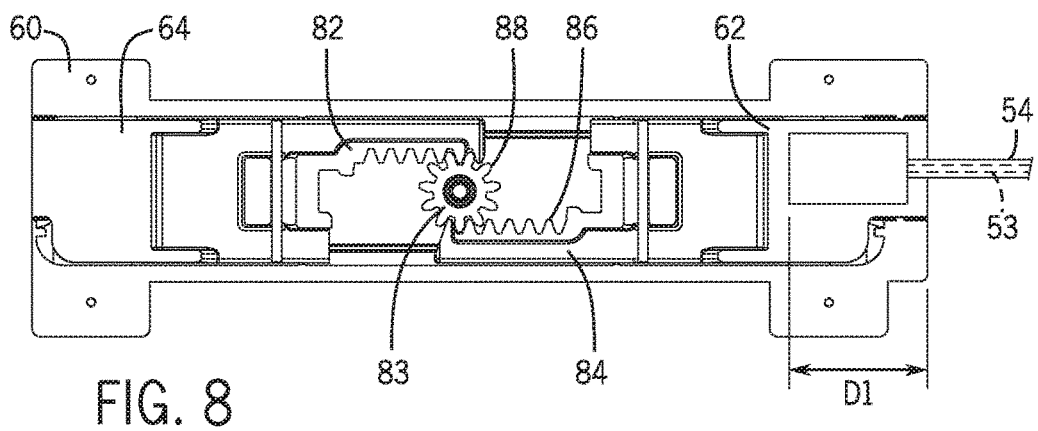
FIG. 8 is a schematic cross-section top view of the latch assembly at the extended/latched position according to an exemplary embodiment.

As shown schematically in FIG. 8 according to an exemplary embodiment, left side arm 64 and right side arm 62 are at the extended position. As shown schematically in FIGS. 7 and 8, a distance D1 is the distance between the right edge of latch assembly 24 and the inner edge of support structure 65 when button 52 is at the raised/uncompressed position. As shown schematically in FIGS. 8 and 10, right side arm 62 comprises rack 84; teeth 86 on rack 84 engage with teeth 88 on pinion 83; left side arm 64 comprises rack 82; teeth 86 on rack 82 engage with teeth 88 on pinion 83; the remote latching device 55 on the end of cable 53 of right side arm 62 is intended to engage with corresponding remote recess 37 on center console 16 to secure tambour door 22 in positions such as at the open position and the closed position and at other intermediate positions (e.g. various partly-closed and partly-opened positions). See also FIG. 3. According to an exemplary embodiment, right side arm 62 and left side arm 64 are coupled to pinion 83 by a rack and pinion mechanism; right side arm 62 and left side arm 64 move in coordination toward the center of latch assembly 24 (e.g. at pinion 83).

Figure 9:
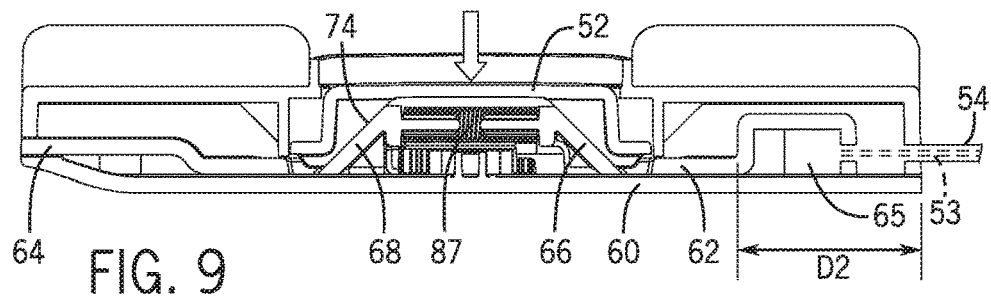
FIG. 9 is a schematic cross-section side view of the latch assembly at a retracted/unlatched position according to an exemplary embodiment.

As shown schematically in FIG. 9 according to an exemplary embodiment, button 52 is at a depressed position; the engagement between surfaces 74, right wedge 66 and left wedge 68 pulls right side arm 62 and left side arm 64 towards the retracted position; spring 87 is compressed between right side arm 62 and left side arm 64. See also FIG. 7 (indicating surfaces 74). As shown schematically in FIGS. 9 and 10, a distance D2 is the distance between the right edge of latch assembly 24 and the inner edge of support structure 65 when button 52 is at the depressed position; distance between the right edge of latch assembly 24 and the inner edge of support structure 65 increases from D1 to D2 as cable 53 moves from the extended position to the retracted position. As shown schematically in FIG. 10, left side arm 64 and right side arm 62 are at the retracted position when button 52 is in the depressed position.

Figure 11:
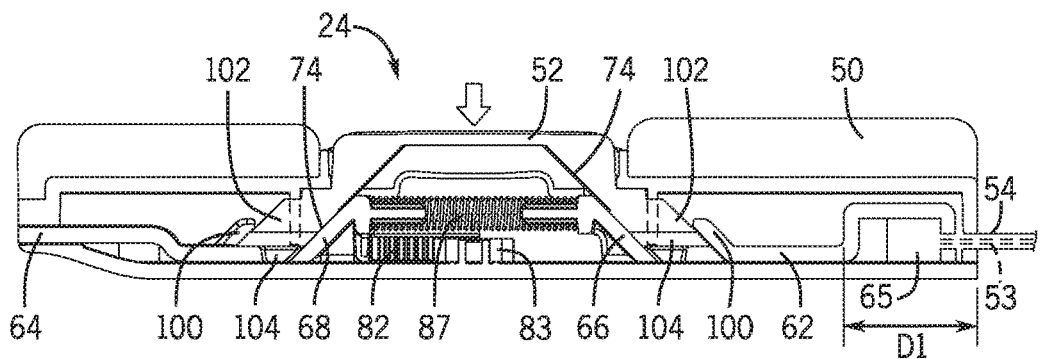
FIG. 11 is a schematic cross-section side view of a latch assembly at an extended/latched according to an exemplary embodiment.
Figures 11A, 12A:
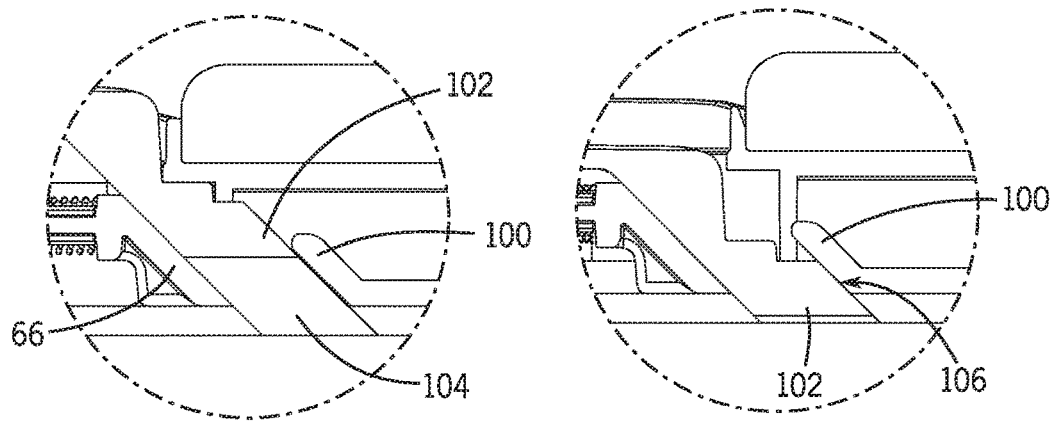
FIG. 11A is a schematic detail cross-section side view of a latch assembly at an extended/latched according to an exemplary embodiment.
FIG. 12A is a schematic detail cross-section side view of the latch assembly at a retracted/unlatched according to an exemplary embodiment.

As shown schematically in FIG. 11 according to an exemplary embodiment, right side arm 62 and left side arm 64 are at the extended position. As shown schematically in FIG. 11, right side arm 62 provides a right wedge 66; left side arm 64 provides a left wedge 68; button 52 provides two surfaces 74 configured to engage with wedge 66 and wedge 68. See also FIG. 7 (indicating surfaces 74). As shown schematically in FIG. 11, right side arm 62 provides a feature shown as a flap 100; left side arm 64 provides a feature shown as a flap 100; button 52 also provides two opposing tabs 102; each tab 102 provides an edge 106; right side arm 62 provides a feature shown as a slit 104; left side arm 64 provides a feature shown as a slit 104. According to an exemplary embodiment, each tab 102 on button 52 is configured to engage with flap 100 on the corresponding side arm (i.e. left side arm 64 or right side arm 62). According to an exemplary embodiment, the contact between flap 100 and the corresponding tab 102 along the corresponding edge 106 is intended to secure button 52 in the depressed position; movement of button 52 relative to upper housing 58 is generally blocked when tabs 102 are secured in the slits 104 on the corresponding side arms. See also FIG. 11A. According to an exemplary embodiment, latch assembly 24 may be installed in any orientation (e.g. upside down in the vertical orientation, etc.); when tabs 102 are secured in the slits 104 on the corresponding side arms, button 52 would be retained in the depressed position. See also FIGS. 11A and 12A (detail view).

Figure 12:
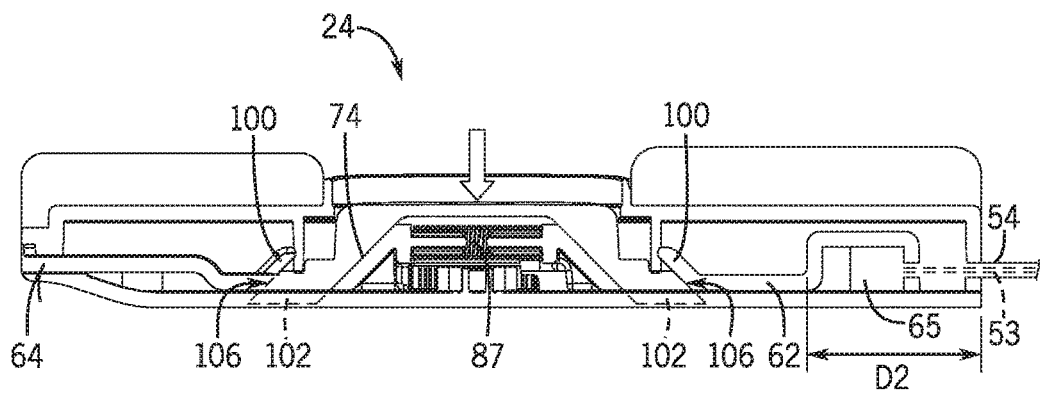
FIG. 12 is a schematic cross-section side view of the latch assembly at a retracted/unlatched according to an exemplary embodiment.

As shown schematically in FIG. 12 according to an exemplary embodiment, button 52 is at a depressed position; the engagement between surfaces 74, wedge 66 and wedge 68 pulls right side arm 62 and left arm 64 towards the retracted position; spring 87 is compressed between right side arm 62 and left arm 64. See also FIGS. 7 and 12A. As shown schematically in FIGS. 11 and 12, a distance D1 is the distance between the right edge of latch assembly 24 and the inner edge of support structure 65 when button 52 is at the raised/uncompressed position; a distance D2 is the distance between the right edge of latch assembly 24 and the inner edge of support structure 65 when button 52 is at the depressed position; distance between the right edge of latch assembly 24 and the inner edge of support structure 65 increases from D1 to D2 as cable 53 moves from the extended position to the retracted position.

As indicated, according to an exemplary embodiment, the latch mechanism/assembly (e.g. as actuated by the button) can be configured to secure/release a door/cover at an open and a closed and partially opened positions. See e.g. FIGS. 2, 3, 7 to 12.

According to an exemplary embodiment, the component for a vehicle interior comprises a base and a bin with a cover configured to move relative to the bin from (1) a closed position to cover the bin to (2) an intermediate position to at least partially uncover the bin to (3) an open position to uncover the bin. See FIGS. 2-3. According to an exemplary embodiment, a latch assembly is provided for the cover configured to release the cover from the base with a latch (actuated by the latch assembly) to secure the cover to the base. According to an exemplary embodiment, a cable is provided between the latch assembly and the latch. See FIGS. 2-3. The latch may be configured to secure the cover to the base in the closed position, the intermediate position and the open position. The latch may comprise a pin coupled to the cable configured to engage a recess of the base to secure the cover to the base. The latch may comprise at least one of (a) a latch device and (b) a remote latch device. The latch assembly may comprise a button configured to release the cover from the base. The latch assembly may comprise set of arms; an arm may be configured to release the cover from the base in response to a force at the button; the arm may be configured to move the cable from an extended position to a retracted position to actuate the latch to release the cover from the base; an arm with a linkage may be configured to couple each arm. See FIGS. 6, 8-10 and 11-12. The latch assembly may comprise a spring configured to move the cable from the retracted position to the extended position to secure the cover to the base. See FIGS. 6, 8-10 and 11-12. The base may comprise a support structure. The cover may comprise at least one of (a) an armrest, (b) an access door, (c) a door, (d) a tambour door; the bin may comprise a storage area; the component may comprise at least one of (a) a center console, (b) a dash, (c) a door panel, (d) an instrument panel, (e) a trunk storage system, (f) an armrest.

Exemplary Embodiments

As shown schematically in FIG. 1 according to an exemplary embodiment, a vehicle 10 includes an interior 12 having seats 14, a center console 16 and a dash 18. According to an exemplary embodiment, the center console 16, the dash 18 and/or other areas within the interior 12, such as a door panel, an instrument panel, a trunk storage system, or an armrest, may include a latch assembly having any of a variety of suitable functions. According to an exemplary embodiment, the latch assembly is configured to selectively secure a sliding armrest to a suitable support structure. According to an exemplary embodiment, the latch assembly is configured to selectively secure an access door to a suitable support structure such as a door of a storage compartment. According to an exemplary embodiment, the center console 16 may employ a tambour door having the latch assembly that secures the tambour door in one or more track locations. The latch assembly may include a button and a cable, and the cable moves from an extended position to a retracted position as the button is depressed. Retraction of the cable may actuate a remote mechanism (e.g. a remote release mechanism or a remote latching mechanism). According to an exemplary embodiment, the cable may be coupled to a remote latching device/mechanism, such as a pin or a hook, which engages a corresponding remote recess, such as a corresponding remote recess of the center console 16 to secure the tambour door in the one or more locations. Depression of the button and resulting retraction of the cable removes the remote latching device/mechanism from the corresponding remote recess. According to an exemplary embodiment, depression of the button and resulting retraction of the cable may remove the remote latching device/mechanism from the corresponding remote recess of the center console 16 to enable movement of the tambour door. According to an exemplary embodiment, the dash 18 may include a glove compartment that is secured by a door that is held in a closed position by a latch assembly having the button and the cable.

According to an exemplary embodiment, typical vehicle interior doors (e.g. access doors) or other movable components (e.g. sliding armrests) within the vehicle include a number of methods of securing the movable component or the door to the compartment or support structure in a desired position. Typical movable components or doors can suffer from accidental unlatching during use. According to an exemplary embodiment, when an occupant of the vehicle 10 rests an arm or an elbow on the center console 16, the door may undesirably move or open. According to an exemplary embodiment, latching devices and/or the corresponding recesses in typical doors may be unsightly features observable by the operator/occupant of the vehicle 10 and/or may form a loose or uncomfortable bump above a surface of the door. According to an exemplary embodiment, features of the latch assembly enable certain components of the latch assembly and/or corresponding recesses to be positioned remotely from the button, or actuator, of the latch assembly. According to an exemplary embodiment, a latch assembly may increase aesthetic appeal and mechanical functionality.

According to an exemplary embodiment, the latch assembly may be utilized with any of a variety of interior and exterior vehicle doors or other movable components within the vehicle. As shown schematically in FIG. 2, certain features of the latch assembly are discussed in the context of a door positioned over a storage compartment of a center console. As shown schematically in FIG. 2, the center console 16 may be located within an interior of the vehicle 10. The center console 16 may include a storage compartment 20 enclosed by a door 22 having a latch assembly 24. As shown schematically in FIG. 2, the center console 16 is coupled to a floor of the vehicle interior 12 between a driver seat 14 and a passenger seat 14. As shown schematically in FIG. 2, the center console 16 is configured to provide a storage area and an armrest for at least one vehicle occupant. The center console 16 also includes a base 36 which form the main body of the console 16. The top surface of base 36 includes an opening that enables an occupant to access an interior (i.e. storage compartment 44 shown in FIG. 3) of the center console 16.

As shown schematically in FIG. 2, the center console 16 includes the door 22 configured to transition between an open position (shown in FIG. 3) and a closed position (shown in FIG. 2). According to an exemplary embodiment, the latch assembly 24 may be configured to enable an occupant to secure the door 22 at a number of positions between and including the open position and the closed position. According to an exemplary embodiment, the latch assembly 24 may include a cable that actuates a remote mechanism (e.g. a remote latching mechanism or a remote release mechanism). The remote mechanism may have any suitable form for facilitating selective movement and/or securement of the door 22. According to an exemplary embodiment, a remote latching device may extend from a cable of the latch assembly 24 to engage one or more remote corresponding recesses 37. See also FIG. 5. As shown schematically in FIG. 2, one or more of the remote corresponding recesses 37 are positioned in a portion (e.g. a rear portion or a covered portion) of the center console 16 remote from the opening and/or remote from a button of the latch assembly 24. According to an exemplary embodiment, the remote corresponding recesses 37 may be positioned in any suitable location and/or may have any suitable form for interacting with the remote latching device of the cable to secure and release the door 22. According to an exemplary embodiment, one or more of the remote corresponding recesses 37 may be concealed, such as by top surface of the center console 16, while the door 22 is in the open position and/or while the door 22 is in the closed position.

As shown schematically in FIG. 3, according to an exemplary embodiment, sliding the door 22 toward the open position will expose an interior of a storage compartment 44 located within the center console 16. According to an exemplary embodiment, the door 22 is a tambour door having a series of substantially parallel ribs that are configured to engage a track 40 within the side walls of the center console 16 and to facilitate movement of the door 22 along the track 40. According to an exemplary embodiment, a door may be positioned throughout the interior 12 of the vehicle 10. According to an exemplary embodiment, a storage compartment located within an overhead console, door panel, instrument panel, the dash 18, or other region of the interior 12 may include a door having the latch assembly 24. Other interior trim components may include the latch assembly 24. According to an exemplary embodiment, providing the latch assembly 24 may enable a vehicle occupant to retain the door 22 (e.g. a tambour door) in a desired position over the storage compartment 44 without accidental unlatching.

As shown schematically in FIG. 3, the door 22 is in the open position. As shown schematically in FIG. 3, the side walls of the center console 16 include rails or tracks 40 configured to facilitate movement of the door 22. According to an exemplary embodiment, the track 40 may provide a C-shaped cross section, and may be coupled to the base 36 or integrally formed within the base 36. The substantially parallel ribs of the door 22 include protrusions which engage the tracks 40 and support the door 22. As shown schematically in FIG. 3, transitioning the door 22 to the open position exposes an interior of the storage compartment 44 within the center console 16.

According to an exemplary embodiment, a vehicle occupant may close the door 22 by actuating the latch assembly 24 and moving the door 22 toward the front wall 20 of the center console 16. According to an exemplary embodiment, the latch assembly 24 may include a cable that extends to a remote latching mechanism that is configured to engage one or more of the remote corresponding recesses 37 to secure the door 22 to the center console 16 according to an exemplary embodiment. When the door 22 is in the closed position, the exterior surface of the door 22 may provide a suitable surface for writing and/or storage of small items.

As shown schematically in FIG. 5, the door 22 provides the latch assembly 24, which may be employed within the center console 216. As shown schematically in FIG. 5, the door 22 includes a substrate 50. According to an exemplary embodiment, the door 22 includes the latch assembly 24 that may have any suitable function, such as selectively securing the door 22 in a desired position (e.g. the open position, the closed position, partially closed position, etc.). As shown schematically in FIG. 5, the latch assembly 24 includes a button 52 (e.g. an actuator). According to an exemplary embodiment, the latch assembly 24 may employ other components (e.g. knobs, recesses, etc.) in place of the button 52. The latch assembly 24 also includes a cable 53 that may be disposed within a sheath 54. According to an exemplary embodiment, the latch assembly 24 further includes a remote latching device 55, such as a pin or a hook. According to an exemplary, the remote latching device 55 may be configured to engage the corresponding remote recess 37 to secure the door 22 to an interior component of the vehicle, such as to the center console 16. The remote latching device 55 may be configured to withdraw from or disengage the corresponding remote recess 37 to enable movement of the door 22 relative to the interior component of the vehicle, such as relative to the center console 16. Upon actuation of the button 52, the cable 53 moves from the extended position to a retracted position, withdrawing the remote latching device from the corresponding remote recess 37. According to an exemplary embodiment, the cable 53 may be coupled to a secondary latch assembly to enable remote actuation of the secondary latch assembly.

As shown schematically in FIG. 5, the cable 53 extends laterally outwardly from one side of the door 22. According to an exemplary embodiment, the cable 53 may extend from any suitable portion of the door 22 and/or may be coupled to the substrate 50 and extend along the substrate 50. According to an exemplary embodiment, the cable 53 may have a fixed length; the cable 53 may be flexible along at least a portion of the fixed length. According to an exemplary embodiment, the cable 53 is greater than approximately 3, 5, 10, 15, 20, 25, 30, 35, 40, 45, or 50 centimeters (cm). According to an exemplary embodiment, the cable 53 is between approximately 5 to 50, 10 to 40, or 20 to 30 cm.

As shown schematically in FIG. 5, the button 52 is constructed to be flush with the substrate 50 while in a raised position. An occupant of the vehicle 10 can rest an arm or an elbow on the substrate 50 of the door 22 without accidentally opening the door 22. The aesthetic appearance may be enhanced. According to an exemplary embodiment, the button 52 may be designed to receive a force from an occupant of the vehicle 10 to move the cable 53 toward the button 52 (e.g. laterally inward, as shown schematically in FIG. 5). As shown schematically in FIG. 5, the button 52 is configured to receive a force in a first direction perpendicular to the surface of the substrate 50. As the button 52 moves in the downward direction the cable 53 retracts (e.g. moves laterally inward) and/or moves toward the button 52. A length of the cable 53 external to the door 22 decreases as the button 52 moves in the downward direction. According to an exemplary embodiment, such movement of the cable 53 removes the remote latching device 55 from the corresponding remote recess 37 of the interior vehicle component, such as the center console 16, and enables movement of the door 22.

As shown schematically in FIG. 7, the latch assembly 24 is in an uncompressed position. The latch assembly 24 includes the button 52, and the cable 53 within the sheath 54. As shown schematically in FIG. 7, the latch assembly 24 also includes an upper housing 58 and a lower housing 60 that contain and/or support the mechanical components of the latch assembly 24. The upper housing 58 may be coupled to the substrate 50, such that the button 52 is flush with the substrate 50 and moves below the level of the substrate 50 when an occupant applies a depressing force to the button 52. As shown schematically in FIG. 7, the latch assembly 24 is in the raised position; the button 52 is up and the cable 53 is extended. As shown schematically in FIG. 7, the cable 53 is coupled to a support structure 65 and a right side arm 62 (e.g. a first side arm) that responds to movement of the button 50 in the downward direction. The right side arm 62 is coupled to a right wedge 66; a left side arm 64 (e.g. a second side arm) positioned generally opposite the right side arm 62 is coupled to a left wedge 68. Each wedge (e.g. 66, 68) is disposed at an angle. The angles may be configured to match an angle of contacting surfaces 74 of the button 52. When the button 52 moves downward, the contacting surfaces 74 contact and engage the wedges 66, 68 and apply a translational force to the wedges 66, 68.

As shown schematically in FIGS. 7 and 9, translational force from the button 52 drives the left wedge 68 to slide to the right (e.g. in a second direction that is generally perpendicular to the first direction) as the contacting surface 74 slides down along the surface of the left wedge 66. As shown schematically in FIGS. 7 and 9, the translational force from the button 52 drives the right wedge 66 to slide to the left (e.g. in a third direction that is generally perpendicular to the first direction and opposite to the second direction) as the contacting surface 74 slides down along the surface of the right wedge 66. The movement of the right wedge 66 pulls the right side arm 62 to the left. Such movement also retracts the cable 53, or pulls the cable 53 to the left and/or toward the button 52. The button 52 includes a cavity 80 that is configured to receive the wedges 66, 68. According to an exemplary embodiment, movement of the right side arm 62 and retraction of the cable 53 drives the remote latch mechanism 55 to disengage from the corresponding remote recesses 37 enabling movement of the door 22.

As shown schematically in FIG. 7, each side arm 62, 64 includes an interlocking section 82. As shown schematically in FIG. 7, the interlocking section 82 of the left side arm 64 is visible. (The relationship between the interlocking section 82 and a linkage 83 (e.g. a circular gear pinion) is discussed in more detail with respect to FIG. 8.) The latch assembly 24 also includes a spring 87 coupled to, or coupled between, the right side arm 62 and the left side arm 64. The spring 87 urges the right side arm 62 in the left direction (e.g. in the second direction) and urges the left side arm 64 (e.g. in the third direction). The spring 87 provides a restoring force that returns the right side arms 62, the left side arm 64 and the button 52 to the position shown in FIG. 7. According to an exemplary embodiment, other mechanisms may be used to restore the side arms 62, 64 and the button 52; each side arm 62, 64 may include an individual spring; each arm 62, 64 may include an elastic band connected to the housing 58, 60; a compressible material may be placed between the side arms 62, 64; other options may also be used to restore the side arms 62, 64, and the button 52. According to an exemplary embodiment, two side arms 62, 64 are shown in FIGS. 7 and 9. According to an exemplary embodiment, one side arm may be provided; the one side arm may be coupled to the cable 53; the spring 87 may bias the one side arm laterally outwardly and/or the one side arm may move along the pinion 83 via the interlocking mechanism 82. Referring to FIGS. 7 and 9, the cable 53 is shown coupled to the right side arm 62. According to an exemplary embodiment, the cable 53 may be coupled to the left side arm 64. According to an exemplary embodiment, one cable 53 may be coupled to the right side arm 62; a second cable 53 may be coupled to the left side arm 64 in the same manner.

As shown schematically in FIG. 8, the latch assembly 24 is in an uncompressed position. The latch assembly 24 includes the right side arm 62, the left side arm 64, the cable 53 within the sheath 54, and the lower housing 60. As shown schematically in FIG. 8, the button 52 is in the raised position with the side arms 62, 64 extended (e.g. laterally outward). As shown schematically in FIG. 8, the interlocking section 82 of the left side arm 64 and an additional interlocking section 84 of the right side arm 62 are visible. The interlocking sections 82, 84 include interlocking teeth 86 that match corresponding teeth 88 that circumferentially surround the pinion 83. The pinion 83 is rotatably coupled to the lower housing 60; the pinion 83 may rotate in response to the movement of the side arms 62, 64. The pinion gear 83 facilitates movement of the right side arm 62 in the left direction and/or the movement of the left side arm 64 in the right direction.

As shown schematically in FIG. 9, the latch assembly 24 is in a compressed position; the button 52 is depressed. According to an exemplary embodiment, when the button 52 is moved downward, the right side arm 62 is translated to the left and the left side arm 64 is translated to the right; the wedges 66, 68 fit into the cavity 80 of the button 52. The movement of the right side arm 62 retracts the cable 53, actuating of the remote latching mechanism 55. According to an exemplary embodiment, retraction of the cable 53 may drive the remote latching mechanism 55, such as a pin or a hook, to be removed from the corresponding remote recesses 37 of the center console 16 enabling movement of the door 22.

Figure 10:
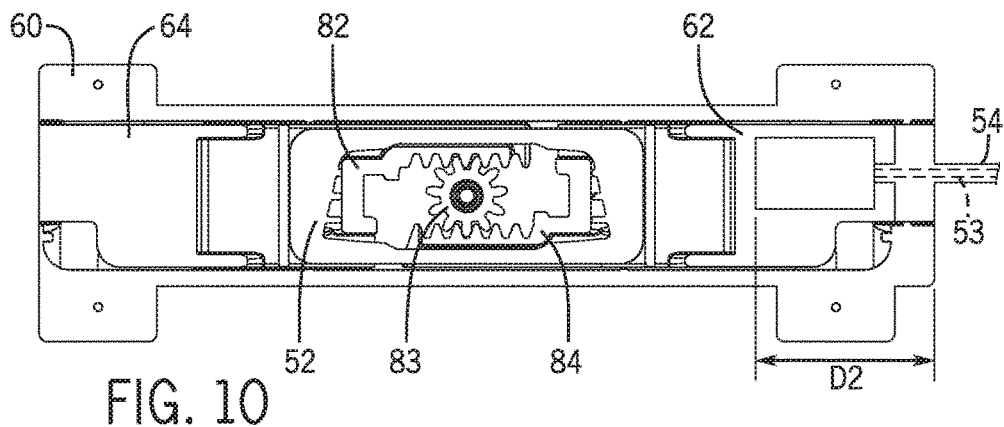
FIG. 10 is a schematic cross-section top view of the latch assembly at the retracted/unlatched position according to an exemplary embodiment.

As shown schematically in FIG. 10, the latch assembly 24 is in an uncompressed position; the latch assembly 24 from the top after the button 52 is moved downward and the side arms 62, 64 are moved toward one another. The right side arm 62 moves in the left direction and the teeth 86 of the interlocking section 84 rotate the pinion 83 via interaction with the pinion teeth 88 on the pinion 83. As shown schematically in FIG. 10, the left side arm 64 and the right side arm 62 move substantially equal distances due to the interaction of the interlocking sections 82, 84 with the pinion 83. As the right side arm 62 moves in the left direction, the cable 53 moves in the left direction (e.g. laterally inward or toward the button 52) such that a length of the cable 53 extending from or positioned external to the lower housing 60 is reduced.

As shown schematically in FIG. 6, the latch assembly 24 includes the upper housing 58, the lower housing 60, and latching components that may be installed within the housing 58, 60. The right side arm 62 and the left side arm 64 may be installed, as shown, with the spring 87 in between to bias the side arms 62, 64 outwardly away from the middle section of the latch assembly 24. The latch assembly 24 also includes the pinion 83 to support and/or to facilitate movement of the right side arm 62 and the left side arm 64. The latch assembly 24 also includes the button 52 to receive a depressing force from an occupant of the vehicle 10, as well as the cable 53 positioned within the sheath 54. The cable 53 is coupled to the support structure 65 and the right side arm 62 and the cable 53 extends laterally outward from the housing 58, 60.

As shown schematically in FIG. 4, the interior 12 of the vehicle provides a glove compartment 90; the glove compartment 90 uses the latch assembly 24. The glove compartment 90 includes a panel door 91 that may slide open along a track, in a similar manner as the tambour door 22. According to an exemplary embodiment, the panel door 91 may open outwardly rotating about a hinge 92 at the bottom of the glove compartment 90. According to an exemplary embodiment, the latch assembly 24 may include the right side arm 62, the cable 53 and the button 52. The cable 53 may extend from the housing 58, 60 toward a corresponding remote recess 94. When the button 52 is depressed, the right side arm 62 pulls the cable 53 from the corresponding remote recess 94 enabling the panel door 91 to move to an open position. As shown schematically in FIG. 4, the corresponding remote recess 94 may be positioned remotely from the button 52. According to an exemplary embodiment, the corresponding remote recess 94 may be concealed while the panel door 91 is in the closed position and/or in the open position. To assist in opening the glove compartment 90 a bumper 96 may be installed behind the latch 24. The bumper 96 may be compressed while the glove compartment 90 is forced closed, pushing against the glove compartment 90. When the button 52 is pushed and the pin 55 is retracted from the remote recess 94 the bumper 96 pushes the panel door 91 outwardly away from the dash 18. The latch assembly 24 may be installed within the dash 18 of the vehicle 10 with the remote recess 94 installed within the panel door 91. The panel door 91 to be constructed with less material, creating a cleaner look when the panel door 91 is in an open position according to an exemplary embodiment.

As shown schematically in FIG. 11, the latch assembly 24 is in an uncompressed position. The latch assembly 24 includes the button 52 and the cable 53. See also FIGS. 7 and 9. As shown schematically in FIG. 11, the latch assembly 24 also includes the upper housing 58 and the lower housing 60 that support the mechanical pieces of the latch assembly 24. The upper housing 58 may be coupled to the substrate 50 such that the button 52 is flush with the substrate 50 and moves below the level of the substrate 50 when an occupant applies a depressing force to the button 52. As shown schematically in FIG. 11, the latch assembly 24 is in the raised or uncompressed position. In the raised and/or uncompressed position the button 52 is up and the cable 53 is extended outwardly. As shown schematically in FIG. 11, each of the right side arm 62 and the left side arm 64 includes a supporting flap 100 that substantially corresponds with (e.g. matches) the angle of the contacting surfaces 74 and the wedges 66, 68. Each supporting flap 100 engages a respective angled tab 102 that extends laterally outward from the button 52. The engagement of the supporting flap 100 and the angled tab 102 blocks lateral shifting of the button 52 in relation to the side arms 62, 64. According to an exemplary embodiment, each angled tab 102 may be aligned (e.g. via engagement with a respective aligning slit 104) formed in the upper housing 58 of the latch assembly 24. Each angled tab 102 protrudes through the respective aligning slit 104; lateral movement of the tab 102 relative to the upper housing 58 is substantially blocked by the slit 104.

As shown schematically in FIG. 12, the latch assembly 24 is in a compressed position. As shown schematically in FIG. 12, the button 52 is depressed. According to an exemplary embodiment, when the button 52 moves downward, the right side arm 62 translates to the left and the left side arm 64 translates to the right. This translation of the side arms 62, 64 also pulls the wedges 66, 68 together such that the wedges 66, 68 fit into the cavity 80 of the button 52. As shown schematically in FIG. 12, the supporting flaps 100 translate with the side arms 62, 64, while maintaining contact with an edge 106 of each angled tab 102. The contact along the edge 106 secures the button 52 in the depressed position, while the side arms are positioned laterally inward. As shown schematically in FIG. 12, the button 52 is blocked from traveling to the raised/uncompressed position (e.g. upward) while the right side arm 62 and the left side arm 64 are positioned laterally inward. According to an exemplary embodiment, when the door 22 is opened slightly and the cable 53 is held inward (i.e., arm 62 is displaced to the left) the button 52 is blocked from moving upward via the supporting flaps 100. According to an exemplary embodiment, the latch assembly 24 may be installed upside down (e.g. in which the button faces downwardly); the supporting flaps 100 block button movement along the vertical orientation. When the side arms 62, 64 are not blocked the spring 87 urges or forces the side arms 62, 64 outward and the wedges 66, 68 force the button 52 to move towards the raise/uncompressed position maintaining a secure fit that minimizes movement or shaking of the button 52.

It is important to note that the construction and arrangement of the elements of the inventive concepts and inventions as described in this application and as shown in the figures above is illustrative only. Although some embodiments of the present inventions have been described in detail in this disclosure, those skilled in the art who review this disclosure will readily appreciate that many modifications are possible without materially departing from the novel teachings and advantages of the subject matter recited. Accordingly, all such modifications are intended to be included within the scope of the present inventions. Other substitutions, modifications, changes and omissions may be made in the design, operating conditions and arrangement of the preferred and other exemplary embodiments without departing from the spirit of the present inventions.

It is important to note that the apparatus of the present inventions can comprise conventional technology (e.g. as implemented in present configuration) or any other applicable technology (present or future) that has the capability to perform the functions and processes/operations indicated in the FIGURES. All such technology is considered to be within the scope of the present inventions and application.

The invention claimed is:

1. A component for a vehicle interior comprising:
    (a) a base;
    (b) a bin;
    (c) a cover configured to move relative to the bin from (1) a closed position to cover the bin to (2) an intermediate position to at least partially uncover the bin to (3) an open position to uncover the bin;
    (d) a latch assembly coupled to the cover configured to release the cover from the base;
    (e) a latch actuated by the latch assembly and configured to secure the cover to the base; and
    (f) a cable extending between the latch assembly and the latch;
    wherein the latch is configured to move the cable from a retracted position to an extended position to secure the cover to the base in the closed position, the intermediate position and the open position.

2. The component of claim 1 wherein the latch assembly comprises a button configured to release the cover from the base.

3. The component of claim 1 wherein the latch comprises a pin coupled to the cable configured to engage a recess of the base to secure the cover to the base.

4. The component of claim 1 wherein the latch assembly comprises a first arm configured to release the cover from the base in response to a force at the button.

5. The component of claim 4 wherein the first arm is configured to move the cable from an extended position to a retracted position to actuate the latch to release the cover from the base.

6. The component of claim 5 wherein the latch assembly comprises a second arm and a linkage configured to substantially link translation of the second arm and the first arm.

7. The component of claim 5 wherein the latch assembly comprises a spring configured to move the cable from the retracted position to the extended position to secure the cover to the base.

8. The component of claim 1 wherein the base comprises a support structure; wherein the cover comprises at least one of (a) an armrest, (b) an access door, (c) a door, (d) a tambour door; the bin comprises a storage area; and wherein the component comprises at least one of (a) a center console, (b) a dash, (c) a door panel, (d) an instrument panel, (e) a trunk storage system, (f) an armrest.

9. A component for a vehicle interior comprising:
    (a) a base;
    (b) a bin;
    (c) a cover configured to move relative to the bin from (1) a closed position to cover the bin to (2) an open position to uncover the bin;
    (d) a latch assembly coupled to the cover comprising a button;
    (e) a latch actuated by the latch assembly and configured to secure the cover to the base; and
    (f) a cable extending between the latch assembly and the latch;
    wherein the button is configured to move between a raised position and a depressed position to release the cover from the base.

10. The component of claim 9 wherein the latch is configured to secure the cover to the base in the closed position and the open position.

11. The component of claim 9 wherein the latch assembly comprises a first side arm configured to translate in response to actuation of the button; a second side arm configured to translate in response to actuation of the button; and a cable extending between the first side arm and the latch; wherein translation of the first side arm actuates the cable to a remote actuating device and release the cover from the base.

12. The component of claim 11 wherein the latch assembly comprises a first wedge coupled to the first side arm and configured to translate the first side arm in response to actuation of the button.

13. The component of claim 12 wherein the latch assembly comprises a second wedge coupled to the second side arm configured to translate the first side arm in response to actuation of the button.

14. The component of claim 11 wherein the latch assembly comprises a linkage configured to substantially link translation of the second side arm to translation of the first side arm.

15. A component for a vehicle interior comprising:
    (a) a base;
    (b) a bin;
    (c) a cover configured to move relative to the bin from (1) a closed position to cover the bin to (2) an open position to uncover the bin;
    (d) a latch assembly coupled to the cover comprising a button configured to release the cover from the base;
    (e) a latch actuated by the latch assembly and configured to secure the cover to the base;
    (f) a cable extending between the latch assembly and the latch; and
    (g) a spring coupled to the cover;
    wherein the spring is configured to bias the latch to secure the cover to the base and to bias the button to prevent movement of the button.

16. The component of claim 15 wherein the latch assembly further comprises a rack and pinion mechanism and the spring.

17. The component of claim 16 wherein the rack and pinion mechanism comprises a gear and two racks.

18. The component of claim 15 wherein the spring is configured to provide (a) a force to move the cable from a retracted position to an extended position to secure the cover to the base and (b) a force to bias the button to a raised position to prevent movement of the button.

19. The component of claim 15 wherein the latch assembly comprises wedges to engage the button and a set of arms configured to be forced outward by the spring so that the wedges move the button toward a raised position.

20. The component of claim 15 wherein the button is configured to be moved from a raised position to a depressed position against a force from the spring.

\* \* \* \* \*